United States Patent [19]

Greene et al.

[11] Patent Number: 4,722,234
[45] Date of Patent: Feb. 2, 1988

[54] POWER-TAKE-OFF SHAFT SPEED INDICATOR

[75] Inventors: Walter D. Greene, Racine; Harold E. Lenz, Kenosha, both of Wis.; Darrel J. Svendsen, Plainfield, Ill.

[73] Assignee: J. I. Case Company, Racine, Wis.

[21] Appl. No.: 936,585

[22] Filed: Dec. 1, 1986

[51] Int. Cl.⁴ .............................................. E16H 37/00
[52] U.S. Cl. .................... 74/15.4; 74/DIG. 7; 200/61.91
[58] Field of Search ............ 74/15.4, 15.86, 11, 74/DIG. 7; 200/61.91; 116/28.1, 62.3, DIG. 20, DIG. 21

[56] References Cited

U.S. PATENT DOCUMENTS

| | | | |
|---|---|---|---|
| 1,536,953 | 5/1925 | Waters | 200/61.91 |
| 2,060,377 | 11/1936 | Knodle | 200/61.91 |
| 2,264,441 | 12/1941 | Heuschkel | 200/61.91 |
| 3,352,165 | 11/1967 | Lee . | |
| 3,410,970 | 11/1968 | Raab | 200/61.91 |
| 3,464,277 | 9/1969 | Longshore | 74/15.4 |
| 3,507,372 | 4/1970 | Gilbertson et al. | 74/15.4 |
| 3,675,497 | 7/1972 | Thomas | 74/11 |
| 3,715,704 | 2/1973 | Boyle et al. | 74/15.4 |
| 3,748,417 | 7/1973 | Morino et al. | 200/61.91 |
| 4,271,942 | 6/1981 | Ballendux | 74/15.4 |
| 4,277,983 | 7/1981 | Izumi et al. | 200/61.91 |
| 4,415,786 | 11/1983 | Takada et al. | 200/61.91 |
| 4,597,301 | 7/1986 | Weis et al. | 74/15.86 |

Primary Examiner—Lawrence J. Staab
Attorney, Agent, or Firm—Dressler, Goldsmith, Shore, Sutker & Milnamow, Ltd.

[57] ABSTRACT

A two-speed power-take-off drive for a tractor is disclosed which includes an assembly for sensing and indicating the PTO shaft speed to an operator in the tractor cab. The speed of the PTO shaft is a function of which end thereof is inserted into the drive sleeve, which determines the extent of its penetration into the drive sleeve. A speed indicator arrangement is provided which includes a sensing rod whose movement is controlled by the extent of penetration of the PTO shaft into the drive sleeve. The sensing rod is operative to activate or inactivate an electrical switch. The electrical input condition of the switch serves as an input to the tractor instrument cluster in the tractor cab to indicate the selected PTO shaft speed.

4 Claims, 1 Drawing Figure

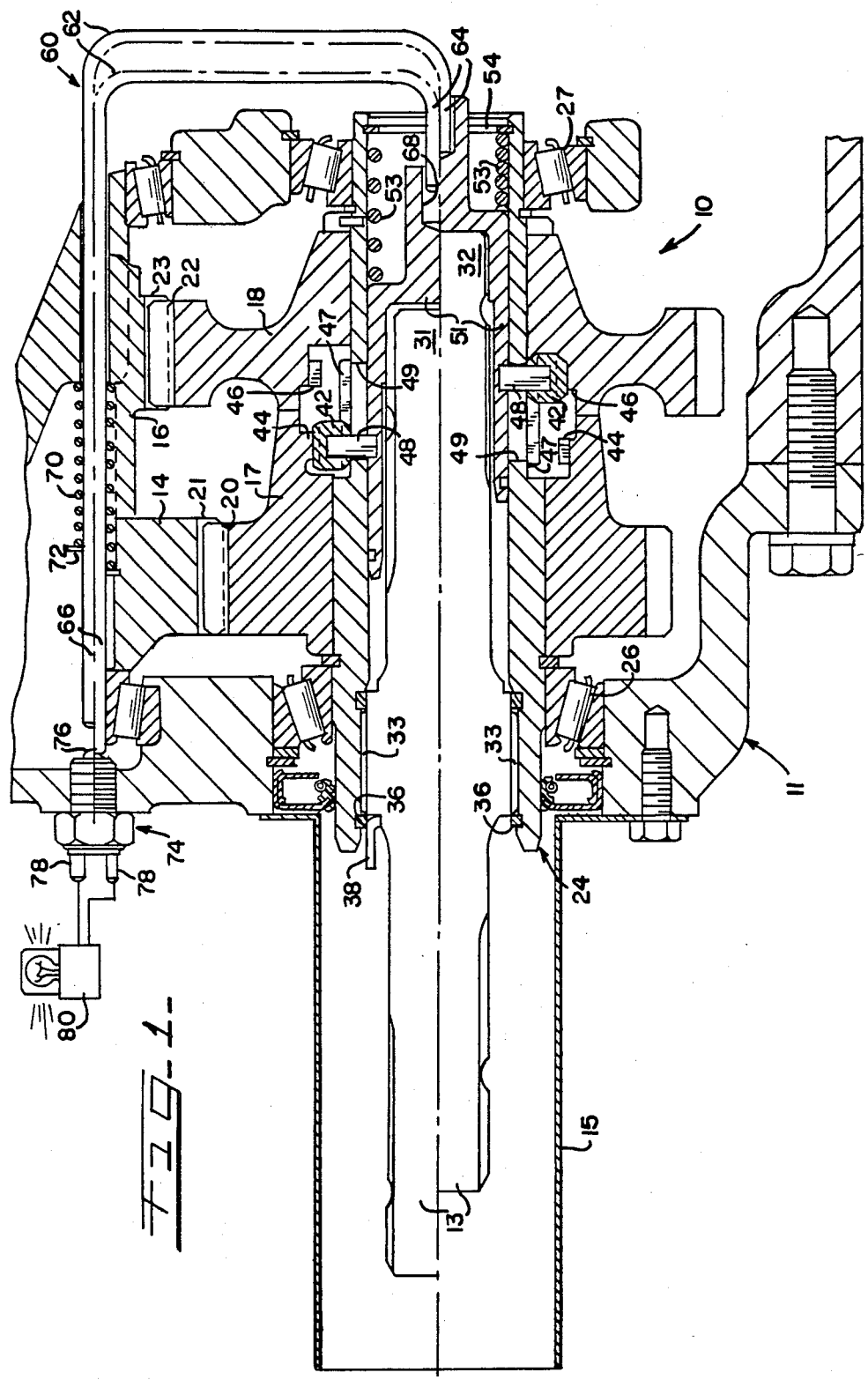

POWER-TAKE-OFF SHAFT SPEED INDICATOR

TECHNICAL FIELD

The present invention is generally directed to a two-speed power-take-off (PTO) drive for a tractor and more particularly to an assembly for sensing and indicating the PTO shaft speed to the operator in the tractor cab.

BACKGROUND OF THE INVENTION

It is common practice to provide a two-speed power-take-off (PTO) drive shaft for a tractor whereby different associated implements can be selectively driven at the two different shaft speeds. In accomplishing this, there has been proposed the employment of two different PTO shafts which alternately mount on the tractor gear box or the like, as well as the employment of a single shaft which mounts on the gear box in two different locations.

In accordance with the teachings of U.S. Pat. No. 3,352,165, assigned to the same assignee as the present invention, a PTO shaft is releasably disposed in a driving sleeve so that the shaft is driven by a splined connection with the sleeve, and can be reversed end-for-end in the sleeve. A two-position clutch element is operatively disposed between the driving sleeve and two associated driving gears, which two gears are rotatable at different speeds.

The clutch element is shiftable between the two driving gears for rotating the sleeve at two different speeds, typically 540 rpm and 1000 rpm. The PTO shaft is longer on one end, from its generally centrally located splines, than it is on its other end. When the shorter end of the shaft is inserted into the driving sleeve, the shaft splines interengage the sleeve splines, but the shaft does not act to shift the clutch element axially. The clutch element thus drives the sleeve (and shaft) at the first of two speeds.

In order to select the other speed, the longer end of the shaft is inserted into the sleeve and engages an inner sleeve connected to the shiftable clutch element, thus effecting axial movement of the clutch element as the shaft splines are engaged with the sleeve splines. The clutch element acts to couple the driving sleeve with the second one of the associated driving gears, whereby the sleeve and shaft are driven at the second PTO speed.

The opposite end portions of the PTO shaft are typically formed with splines each having a different number of teeth. The end portions of the PTO shaft project outwardly from the gear box, which permits the operator to visually determine what speed the shaft will rotate by leaving the cab and observing the difference in the number of spline teeth in the projecting end portion.

In recent years there has been concern raised by the American Society of Agricultural Engineers (ASAE) and the Society of Automative Engineers (SAE) regarding the lack of an indicator of the speed of the PTO shaft located in the tractor cab for convenient reference by the tractor operator. This concern is in part based on the fact that it is possible to "overspeed" the PTO shaft on some tractors, which can cause accessory equipment damage or failure. Additionally, efficient operation of the equipment is promoted by providing the operator with an arrangement of ascertaining PTO shaft speed without requiring visual observation of the shaft.

SUMMARY OF THE INVENTION

The present invention is directed to a unique PTO shaft speed indicator arrangement, particularly for use in conjunction with a PTO drive arrangement of the general type disclosed in U.S. Pat. No. 3,352,165. The speed indicator arrangement includes a switch mechanism which senses the particular PTO shaft speed by referencing the shaft position, thereby activating or deactivating an electrical switch. The electrical input condition of the switch serves as an input to the tractor instrument cluster which in turn displays the appropriate PTO shaft speed to the operator in the tractor cab.

More specifically, the penetration of the PTO shaft into its associated driving sleeve is a function of which end of the shaft (540 rpm or the 1000 rpm) is inserted into the sleeve. The relatively longer end portion of the PTO shaft pushes against an inner sleeve support member slidably received within the drive sleeve, against the bias of a first spring means urging the inner support sleeve member towards the outer end of the drive sleeve.

In accordance with the present invention, a generally J-shaped sensing rod is mounted for reciprocable movement in the associated gear box. The J-shaped sensing rod defines a shorter leg portion extending into the inner end of the PTO shaft drive sleeve for contact with an inward end portion of the slidable inner sleeve support. The J-shaped sensing rod further defines a longer leg portion which extends outwardly towards an outer wall of the gear box. An electrical switch is mounted through an opening in the outer wall of the gear box and includes an actuating element in the form of an electrically conductive ball positioned in facing relationship with the outer free end of the longer leg portion of the sensing rod.

The sensing rod is movable between a first position wherein the free end of the longer leg portion is spaced a short distance from the conductive ball of the electrical switch, and a second position wherein the outer end of the longer leg portion contacts the conductive ball and activates the electrical switch. A second spring means is provided urging the sensing rod towards its second position.

The displacement of the sensing rod between its first and second positions is dependent upon which end of the PTO shaft is inserted into the drive sleeve. In the illustrated embodiment, the distance between the centrally located splines of the PTO shaft and the high speed end thereof is such that the slidable inner sleeve support within the PTO drive sleeve is not urged inwardly against the bias of the first spring means when this shaft end is inserted in the drive sleeve; the sensing rod thus remains in its second position and the electrical switch is in an activated condition.

Upon insertion of the opposite low speed end of the PTO shaft into the drive sleeve, the longer distance between the centrally located splines and the low speed end of the shaft is such that the inner sleeve support is urged inwardly against the bias of the first spring means into contact with the J-shaped sensing rod. The sensing rod is thus moved from its second position into its first position against the bias of the second spring means and thereby deactivates the electrical switch. The electrical switch is provided with electrical terminals which are connected as an input to an indicator light or the like in the instrument cluster in the tractor cab to indicate the PTO shaft position to the operator.

The advantages of the present invention will become apparent upon reading the following description of the invention in light of the accompanying drawings.

BRIEF DESCRIPTION OF THE DRAWING

FIG. 1 is a fragmentary cross-sectional view of a portion of a tractor gear box incorporating a preferred embodiment of the present invention, with parts thereof broken away for clarity, and with parts thereof shown in two different positions on opposite sides of the axes of an illustrated PTO shaft and an associated J-shaped sensing rod.

DESCRIPTION OF A PREFERRED EMBODIMENT

While the present invention is susceptible of embodiment in various forms, there is shown in the drawings and will hereinafter be described a presently preferred embodiment, with the understanding that the present disclosure is to be considered an exemplification of the invention, and is not intended to limit the invention to the specific embodiment illustrated.

A portion of a two-speed power-take-off (PTO) drive assembly for a tractor is generally designated at 10 within a gear box housing 11. The two-speed nature of the assembly permits associated implements to be driven at one of two selected speeds. The PTO drive assembly is typically provided in a tractor gear box for providing power transmission between the prime mover of the tractor and a PTO shaft of the tractor. It will be understood that the gear box would be incorporated in a tractor to drive an output shaft (not shown) operatively connected to the tractor wheels, as well as for driving a PTO shaft 13, which usually extends rearwardly of the tractor such as within a shield 15.

A PTO riving gear cluster consisting of gears 14 and 16, which are only fragmentarily shown in FIG. 1, is included in the PTO drive assembly, with the gears 14 and 16 respectively meshing with gears 17 and 18. It will be understood that the gears 14 and 16 are mounted together on a common shaft, and that these gears are in constant mesh with the gears 17 and 18, respectively. The gear 17 has teeth 21 which are in mesh with the teeth 20 on the gear 14. The gear 18 has teeth 22 which are in mesh with the teeth 23 on gear 16. The tractor gear box typically includes additional gears which are not shown in order to simplify the disclosure of the present invention.

A PTO drive sleeve generally designated at 24 is rotatably mounted in the gear box housing 11 by means of bearing assemblies 26 and 27 interposed between the housing 11 and the sleeve 24 in a conventional and well-known manner. The sleeve 24 is driven by the gears 17 and 18 via a two-position clutch arrangement as will be described. The PTO shaft 13 can be driven at either of two different speeds so that associated implements (not shown) can be powered at the desired speeds that they require.

FIG. 1 shows the PTO shaft 13 in a split display for completeness and clarity. That is, the shaft 13 is both sectioned and split along its axis, and is shown with one end 31 inserted in the sleeve 24 generally in the upper half of the drawing. The opposite end 32 of shaft 13 is shown inserted in the sleeve 24 generally in the lower half of the drawing. Thus, both ends 31 and 32 of the shaft 13 are shown in FIG. 1, whereby the shaft can be driven at either of two output speeds.

Sleeve 24 has a spline connection designated at 33 for coupling with like splines provided on the power-take-off shaft 13. The shaft splines are arranged and located to be in driving relation with the sleeve splines so that the sleeve 24 drivingly rotates the shaft 13 at all times. It will be noted that the shaft ends 31 and 32 are of a different lengths from the location of the shaft splines. Thus the end 32 extends further into the sleeve 24, attendant to mating of shaft and sleeve splines, than the opposite end 31 of the shaft 13.

A snap ring or retainer 36 has a tang 38 which permits removal of the ring 36 from the sleeve 24 so that the shaft 13 can be removed from the sleeve 24 and turned end-for-end and reinserted, as desired. The snap ring 36 is then reinserted to secure the shaft 13 within the sleeve 24.

A two-position clutch element 42 is provided in the PTO drive assembly, and is axially shiftable between the gears 17 and 18 so that external clutch teeth on the clutch element 42 alternately mesh with internal clutch teeth 44 or 46 that are provided on the gears 17 and 18 respectively. Internal gear teeth of the clutch element 42 remain in mesh with external clutch teeth 47 on the sleeve 24 attendant to relative movement of the clutch element, as shown.

Pins 48 are connected to the clutch element 42, and are shown in their two different positions in the upper half and lower half representations of FIG. 1. The pins 48 assume the two different positions by sliding in respective slots 49 in the sleeve 24. When the pins are to the left in the sleeve slots 49, as shown in the upper half of the FIG. 1, the clutch element 42 is coupled to and driven by the gear 17, thus driving sleeve 24 via teeth 47 in the high speed gear or drive. Conversely, when the pins 48 are to the right of the sleeve slots 49, as shown on the lower half of the FIG. 1, the clutch element 42 is in mesh with the gear 18, and sleeve 24 is driven in the low speed drive or gear.

In this manner, the sleeve 24 is driven at the desired two different speeds which are selectively effected by the shifting of the clutch element 42, as described. In order to shift the clutch element attendant to insertion of the different ends of PTO shaft 13, a cup-shaped inner sleeve support member 51 is slidable in the bore of the sleeve 24. The member 51 receives and is connected to the pins 48 to induce the displacement of the pins as the member 51 slides within drive sleeve 24.

A compression coil spring 53 is disposed within the drive 24, and is held in captive relation therein so that one end of the spring bears against an exterior surface of a closed end portion of cup-shaped member 51, and the other end thereof is in contact with a snap ring 54. Thus, the spring 53 yieldingly urges or biases the member 51 axially to the left in FIG. 1, that is towards the high speed position such that clutch element 42 is coupled with gear 17.

It will be noted that when the end 32 of PTO shaft 13 is inserted into the drive sleeve 24 and the open end portion of member 51, it displaces the member 51 to its right hand position against the bias of spring member 53, which is the low speed position. Thus, rotation of shaft 13 at its lower speed is automatically accomplished by inserting the shaft end 32 into the sleeve 24, and securing the shaft 13 such as by the snap ring 36 in the axial position shown to couple the shaft and drive sleeve 24 of spline connection 33. The end wall of the shaft 13 abuts the inner surface of member 51 to displace the latter to the right, as shown in the lower half of the FIG. 1.

In accordance with the present invention, a speed indicator assembly generally designated 60, is provided for sensing and indicating the position, and thus the output speed, of the PTO shaft 13 to the operator seated in the tractor cab. Assembly 60 includes a generally J-shaped speed sensing rod 62 having a relatively short leg portion 64 and longer leg portion 66. Leg portion 64 has an end portion which is slidably received in an annular recess 68 formed in the inner support member 51. Leg portion 66 is suitably supported in the gear box housing so as to permit translational or reciprocable movement of sensing rod 62 between a first position, as shown by the outer half representation in FIG. 1, and a second position, as shown in the inner half representation in FIG. 1.

Sensing rod 62 is biased toward its second position by a compression coil spring member 70 received about leg portion 66 and held captive between a washer 72 attached to leg portion 66 and a portion of the housing. When the high speed shaft end 31 is inserted into sleeve 24 (or when no shaft is inserted into sleeve 24), the inner support member 51 is disposed in the left-hand position, as shown in the upper half of FIG. 1, and the sensing rod 62 is biased into its second position by spring 70. When the low speed shaft end 32 is inserted into the sleeve 34, the inner support member 51 is displaced to the right-hand position as shown in the lower half of FIG. 1, against the ibas of spring 53, which in turn displaces the sensing rod 62 from its second position to the right into its first position against the bias of spring 70.

A suitable electrical switch assembly 74 extends through an opening in a portion of gear box housing 11. In the illustrated embodiment, switch 74 is of the type which includes a conductive ball 76 positioned within the housing 11 in facing or confronting relationship with the free end of leg portion 66 of sensing rod 62. Conductive ball 76 is spring-loaded outwardly into a normally electrically open or inactivated position and is movable inwardly against the bias of a spring (not shown) into an electrically closed or activated position.

As shown, when the low speed shaft end 32 is inserted into sleeve 24 and the sensing rod 62 is in its first position, the leg portion 66 is spaced from ball 76 and the switch is in its electrically open or deactivated position. However, when the high speed shaft end 31 is inserted into drive sleeve 24, or when no shaft is inserted into sleeve 24, the sensing rod 62 is in its second position and the leg portion 66 contacts ball 76, and is biased by spring 70 against the ball for urging it inot its electrically closed or activated position.

Switch 74 is provided with suitable electrical terminals 78 which extend exterior of the housing. The electrical terminals are electrically connected as an input to a suitable instrument 80 in the instrument cluster of the tractor cab to indicate to the operator whether the PTO shaft is operating at its high speed or its low speed.

The speed indicator assembly in accordance with the invention permits the operator to determine the PTO shaft speed while seated in the tractor cab. The location of the switch assembly 74 through an opening in the housing of the gear box, and the utilization of the sensing rod 62, desirably avoids the necessity of subjecting the entire switch to contact with the hot transmission fluid. In so doing, not only is the reliability of the switch is improved, but further the ability to replace the switch is facilitated in the case of failure.

While a specific embodiment of the invention has been shown and described, it is anticipated that certain changes may be made therein without departing from the spirit and scope of the invention as set forth in the appended claims.

What is claimed is:

1. A two-speed power-take-off drive assembly and speed indicator arrangement, comprising:
   a gear box housing;
   a power-take-off drive sleeve rotatably mounted in said housing;
   two-position clutch means movable axially of said drive sleeve for selectively coupling said drive sleeve in driven relationship with either one of two associated gear means;
   inner sleeve means disposed for relative axial movement within said drive sleeve and operatively connected with said two-position clutch means, said inner sleeve means being engageable by a power-take-off shaft inserted into said drive sleeve for axially moving said inner sleeve means and said clutch means;
   generally J-shaped sensing rod means reciprocably movably mounted in said housing, said J-shaped sensing rod means including a first relatively long leg portion spaced from and extending within said housing in parallel relationship to the rotational axis of said power-take-off drive sleeve, and a relatively short leg portion connected to said first leg portion, said short leg portion being operatively associated with said inner sleeve means such that axial movement of said inner sleeve means reciprocably moves said J-shaped sensing rod means; and
   electric switch means operatively associated with said first long leg portion of said J-shaped sensing rod means for activation and deactivation of said switch means attendant to reciprocable movement of said sensing rod means, said electrical switch means being mounted through an outer wall of said gear box housing to facilitate access to said switch means.

2. A power-take-off drive assembly in accordance with claim 1, including
   compression spring means positioned about said long leg portion of said J-shaped sensing rod means and held captive between a portion of said housing and a retaining means on said long leg portion.

3. A power-take-off drive assembly in accordance with claim 1, wherein
   said inner sleeve means is provided with a recess formed therein for receiving said short leg portion of said J-shaped sensing rod.

4. The power-take-off drive assembly in accordance with claim 1, wherein
   said electric switch means is electrically connected with instrument means positioned in an operator's control area for indicating to the operator the speed of the power-take-off shaft.

* * * * *